United States Patent
Godzaridis et al.

(10) Patent No.: US 10,255,720 B1
(45) Date of Patent: Apr. 9, 2019

(54) HYBRID MESH FROM 2.5D AND 3D POINT DATA

(71) Applicant: Bentley Systems, Incorporated, Exton, PA (US)

(72) Inventors: Elenie Godzaridis, Quebec (CA); Mathieu St-Pierre, Ste-Brigitte De Laval (CA)

(73) Assignee: Bentley Systems, Incorporated, Exton, PA (US)

(*) Notice: Subject to any disclaimer, the term of this patent is extended or adjusted under 35 U.S.C. 154(b) by 239 days.

(21) Appl. No.: 15/293,105

(22) Filed: Oct. 13, 2016

(51) Int. Cl.
*G06T 17/20* (2006.01)

(52) U.S. Cl.
CPC .................. *G06T 17/205* (2013.01)

(58) Field of Classification Search
CPC .................................................. G06T 17/205
See application file for complete search history.

(56) References Cited

U.S. PATENT DOCUMENTS

| 6,081,624 | A | * | 6/2000 | Krishnaswamy | ......... | G06T 9/40 |
| | | | | | | 382/240 |
| 8,762,493 | B1 | | 6/2014 | Kirmse et al. | | |
| 9,390,556 | B2 | | 7/2016 | Masry | | |
| 2004/0210429 | A1 | * | 10/2004 | Yu | ....................... | B29C 45/7693 |
| | | | | | | 703/9 |
| 2008/0046816 | A1 | * | 2/2008 | Cao | ......................... | G06F 9/451 |
| | | | | | | 715/853 |
| 2009/0185741 | A1 | | 7/2009 | Nahari et al. | | |
| 2011/0225208 | A1 | * | 9/2011 | Boersma | ................. | G06T 17/05 |
| | | | | | | 707/803 |
| 2012/0026291 | A1 | * | 2/2012 | Lee | ...................... | H04N 13/388 |
| | | | | | | 348/46 |
| 2012/0166166 | A1 | * | 6/2012 | Czernuszenko | ........ | G06T 19/00 |
| | | | | | | 703/6 |
| 2013/0106852 | A1 | * | 5/2013 | Woodhouse | ............ | G06T 17/20 |
| | | | | | | 345/423 |
| 2014/0098090 | A1 | | 4/2014 | Schmidt et al. | | |
| 2014/0267262 | A1 | * | 9/2014 | Masry | ..................... | G06T 17/20 |
| | | | | | | 345/423 |
| 2015/0024336 | A1 | * | 1/2015 | Blassnig | ................. | G06T 15/06 |
| | | | | | | 433/29 |
| 2015/0073711 | A1 | * | 3/2015 | Brewington | ........... | G01V 11/00 |
| | | | | | | 702/5 |

(Continued)

OTHER PUBLICATIONS

3D Topographic Data Modelling: Why Rigidity Is Preferable to Pragmatism, Penninga, pp. 409-425, Springer-Verlag, 2005.*

(Continued)

*Primary Examiner* — Jitesh Patel
(74) *Attorney, Agent, or Firm* — Cesari and McKenna, LLP; James A. Blanchette (57) ABSTRACT

In an example embodiment, a technique is provided for reconstructing and analyzing a mesh surface based on a combination of 2.5D and 3D point data that involves building a hybrid spatial index whose nodes are labeled as containing 2.5D data or 3D data, and whose branching is adapted to such types of data. The hybrid spatial index is then used to reconstruct the mesh surface and analyze the mesh surface, taking advantage of more efficient algorithms adapted to specific types of data. The technique may allow for a hybrid spatial index that uses fewer nodes, and for use of 2.5D specific reconstruction and analysis algorithms for at least a part of the mesh surface.

20 Claims, 7 Drawing Sheets

(56) References Cited

U.S. PATENT DOCUMENTS

| | | | | |
|---|---|---|---|---|
| 2015/0154467 | A1* | 6/2015 | Feng | G06K 9/48 |
| | | | | 382/203 |
| 2015/0187130 | A1* | 7/2015 | Guskov | G06T 17/20 |
| | | | | 345/420 |
| 2016/0284123 | A1* | 9/2016 | Hare | G06T 7/55 |
| 2017/0004627 | A1* | 1/2017 | Baloch | G06T 17/20 |
| 2017/0148211 | A1* | 5/2017 | Zakhor | G06T 15/005 |
| 2017/0221238 | A1* | 8/2017 | Limberger | G06T 11/206 |
| 2017/0299770 | A1* | 10/2017 | Brewer | G01V 99/005 |

OTHER PUBLICATIONS

A Multidimensional Geographical Data Model, Cambray et al, International Conference on Management of Data, May 1994.*
"Autodesk® ReMake: Getting Started Guide v.01," Autodesk, Inc., May 2016, pp. 1-53.
"Cesium 3DTiles™: Specification for streaming massive heterogeneous 3D geospatial datasets", <https://github.com/AnalyticalGraphicsInc/3d-tiles#will-3d-tiles-include-terrain>, Retrieved on Sep. 29, 2016, pp. 1-36.
"ERSI Indexed 3D: Scene Layers: Scene Service and Package Specification," <https://github.com/Esri/i3s-spec>, Sep. 15, 2016, pp. 1-121.
"ESRI ArcGIS 9.2 Help—Understanding Terrain Datasets," <http://webhelp.esri.com/arcgisdesktop/9.2/index.cfm?TopicName=Creating_terrains_in_a_geodatabase>, Mar. 12, 2008, pp. 1-22.
"ESRI ArcGis 10.2 Help—Fundamentals of Surfaces," <http://resources.arcgis.com/en/help/main/10.2/index.html#/Resolution_of_a_raster_surface/00q8000000w8000000/>, Oct. 30, 2014, pp. 1-25.
"ESRI ArcGis 10.2 Help—LAS Dataset ," <http://resources.arcgis.com/en/help/main/10.2/index.html#/as_a_surface/015w0000005w000000/>, Oct. 30, 2014, pp. 1-95.
"ESRI ArcGis 10.2 Help—TIN," <http://resources.arcgis.com/en/help/main/10.2/index.html#/as_TIN_nodes_by_elevation/00600000001p000000/>, Oct. 30, 2014, pp. 1-39.
Feldman, Bryan E., et al., "Animating Gases with Hybrid Meshes," Computer Graphics Proceedings, Annual Conference Series 2005, ACM SIGGRAPH2005, Los Angeles, CA, Aug. 1-4, 2005, pp. 904-909.
"High Definition 3D From Reality: Autodesk® ReMake," <http://remake.autodesk.com/about>, Autodesk, Inc., 2015, Retrieved on Oct. 12, 2016, pp. 1-4.
"RealityCapture," Product Description, <https://www.capturingreality.com/>, Retrieved on Oct. 12, 2016, pp. 1-6.
"Turn Photos into 3D Models Automatically with ContextCapture," <https://www.acute3d.com/contextcapture/>, Accute3D Company, Product Description, Bentley Systems, Incorporated, 2015, Retrieved on Oct. 12, 2016, pp. 1-2.
U.S. Appl. No. 15/232,446, filed Aug. 9, 2016 by Elenie Godzaridis et al. For a Multi-Resolution Tiled 2.5D Delaunay Triangulation Stitching, pp. 1-40.
Wang, Yanmin, et al., "An Integrated Spatial Indexing of Huge Point Image Model," International Archives of the Photogrammetry, Remote Sensing and Spatial Information Sciences, vol. XXXIX-B4, 2012, XXII ISPRS Congress, Melbourne, Australia, Aug. 25-Sep. 1, 2012, pp. 1-5.
Wake, Dan, et al., "A Hybrid Mesh Generation Method for Two and Three Dimensional Simulation of Semiconductor Processes and Devices," ResearchGate, CiteSeer, May 2000, pp. 1-8.

* cited by examiner

HYBRID MESH FROM 2.5D AND 3D POINT DATA

BACKGROUND

Technical Field

The present disclosure relates generally to techniques for reconstructing and analyzing mesh surfaces, and more specifically to techniques for reconstructing and analyzing mesh surfaces based on a combination of 2.5D and 3D point data.

Background Information

Various survey and computer aided design (CAD) tasks utilize large quantities of point data that describe the physical environment and existing or planned structures. The point data may be obtained from a variety of different sources, such as manual surveys, LiDAR, terrain models, structure models, etc. In order to visualize and analyze the point data it is often necessary to reconstruct (e.g., triangulate) a mesh surface from the individual points described in the data. After reconstruction, the mesh surface may be displayed in a user interface or subject to analysis, such as volume calculation, ray projection, vector draping, etc. as part of a design or engineering workflow.

Reconstruction and analysis may be complicated, however, due to point data originating from different sources. Some sources may only represent the physical environment or structures in two and a half dimensions (2.5D), for example, as a height map or digital terrain model, and thereby provide only 2.5D data. Other sources may represent the physical environment or structures in three-dimensions, for example, point clouds, and thereby provide 3D data. So point data from various sources is mixed the result may be a combination of 2.5 and 3D data.

It can be challenging to reconstruct and analyze a combination of 2.5D and 3D data. Existing systems often simply assume all the data is 3D, and apply the same 3D capable reconstruction algorithm to both the 2.5D and 3D data, as many such algorithms can also handle 2.5D data. While this approach works, applying the same 3D capable reconstruction algorithm to both 2.5D and 3D data can be quite inefficient, as simplifying assumptions that can be made when reconstructing a mesh surface from 2.5D data cannot be used. Further, existing systems often simply apply the same 3D capable analysis algorithms to portions of the mesh surface reconstructed from 2.5D data and to portions of the mesh surface reconstructed from 2.5D data. Optimized analysis algorithms that may be only applicable to 2.5D often are not utilized.

Given these shortcomings, there is a need for improved techniques for reconstructing and analyzing a mesh surface based on a combination of 2.5D and 3D point data.

SUMMARY

A technique is provided for reconstructing and analyzing a mesh surface based on a combination of 2.5D and 3D point data that involves building a hybrid spatial index whose nodes are labeled as containing 2.5D data or 3D data and whose branching is adapted to such types of data. The hybrid spatial index may include fewer nodes than one that ignores data type in its branching. Further, the hybrid spatial index may be used to apply more efficient 2.5D specific reconstruction algorithms to 2.5D portions of the point data and more efficient 2.5D specific analysis algorithms to portions of the mesh surface reconstructed from 2.5D point data.

In an example embodiment, a visualization and analysis application accesses a plurality of data sources that collectively include 2.5D point data and 3D point data. The application classifies each of the data sources as being either a 2.5D data sources or a 3D data source (such that zero or more sources are classified as 2.5D data sources and zero or more sources are classified as 3D data sources), and then builds a hybrid spatial index therefrom. The hybrid spatial index is organized as a tree having nodes arranged in one or more levels according to parent-child relationships. The nodes are labeled as containing 2.5D data or 3D data. Branching in the hybrid spatial index is adaptive to whether each parent node is associated with 2.5D data or 3D data. For example, for parent nodes labeled as containing 2.5D data, the tree may branch to four child nodes, while for parent nodes labeled as containing 3D data the tree may branch to eight child nodes.

To reconstruct a mesh surface, the application executes a reconstruction process independently on point data associated with each node of the hybrid spatial index, wherein a different reconstruction algorithm is employed on nodes that are labeled as containing 2.5D data than on nodes that are labeled as containing 3D data. For example, a 2.5D specific reconstruction algorithm, such as a 2.5D Delaunay triangulation algorithm, may be employed on nodes labeled as containing 2.5D data, and a 3D capable reconstruction algorithm, such as a Poisson surface reconstruction algorithm or a 3D Delaunay triangulation algorithm, may be employed on nodes labeled as containing 3D data.

To analyze the mesh surface, the application utilizes a different analysis algorithm on nodes that are labeled as containing 2.5D data than on nodes labeled as containing 3D data, and combines results of the analysis to produce unified analysis results. For example, a 2.5D specific analysis algorithm may be employed on nodes labeled as containing 2.5D data and a 3D capable analysis algorithm may be employed on nodes labeled as containing 3D data.

It should be understood that a variety of additional features and alternative embodiments may be implemented other than those discussed in this Summary. This Summary is intended simply as a brief introduction to the reader for the further description which follows, and does not indicate or imply that the examples mentioned herein cover all aspects of the disclosure, or are necessary or essential aspects of the disclosure.

BRIEF DESCRIPTION OF THE DRAWINGS

The description refers to the accompanying drawings of example embodiments, of which.

DETAILED DESCRIPTION

Figure 1:
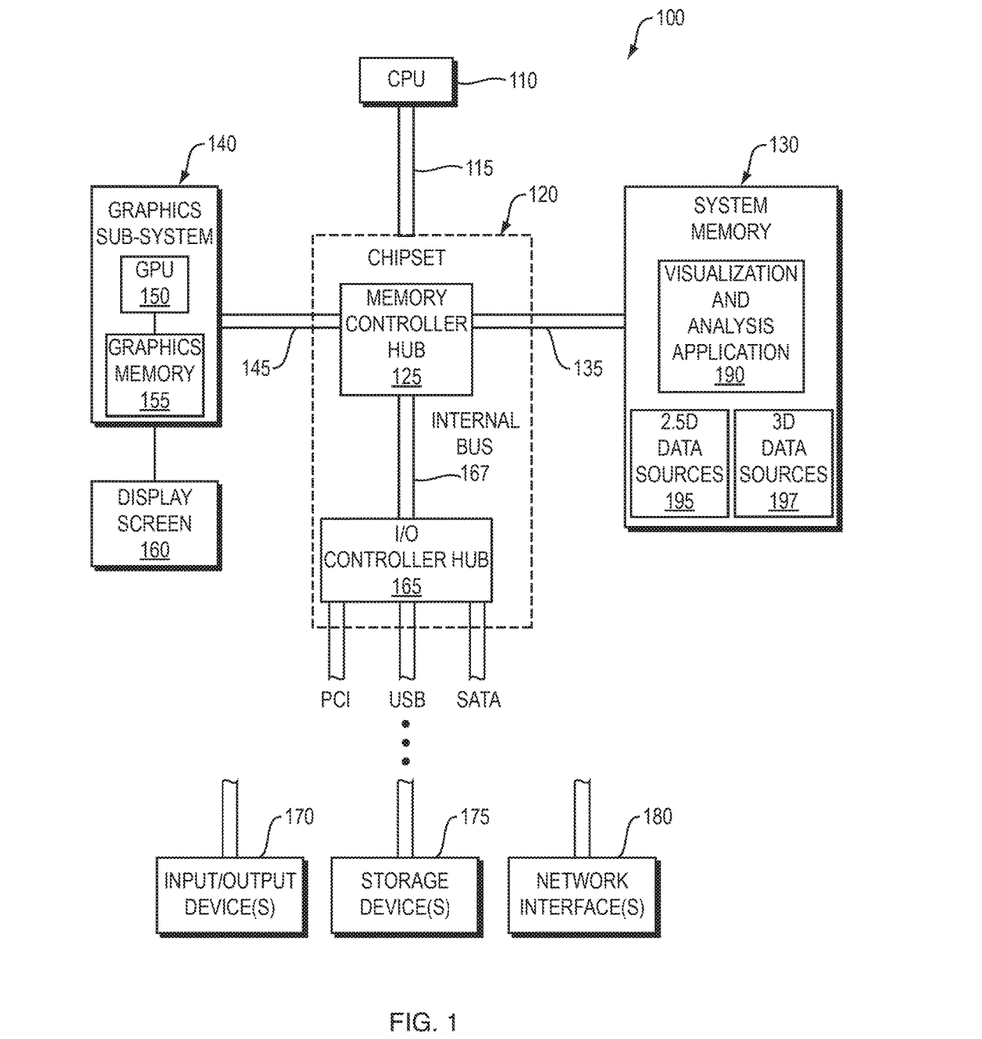
FIG. 1 is a block diagram of an example electronic device (e.g., a computer) that may be used with the present techniques.

FIG. 1 is a block diagram of an example electronic device 100 (e.g., a computer) that may be used with the present techniques. The electronic device includes a central processing unit (CPU) 110 that may be coupled to a chipset 120 by a front side bus 115. The chipset 120 includes a memory controller hub 125 that is responsible for communications with high-speed devices such as system memory 130 and a graphics subsystem (e.g., a graphics card) 140. The memory controller hub 125 is coupled to the system memory 130 by a high-speed memory bus 135. The system memory 130 is typically volatile memory, such as a Random Access Memory (RAM), which is adapted to store a wide range of software and data being actively used by the CPU 110. The memory controller hub 125 is coupled to a graphics subsystem 140 (e.g., a graphics card) by a high-speed graphics bus 145. The graphics subsystem 140 includes a GPU 150 and graphics memory 155, among other components. The graphics subsystem 140 is coupled to at least one display screen 160.

The chipset 120 further includes an input/output controller hub 165 coupled to the memory controller hub by an internal bus 167. Among other functions, the input/output controller hub 165 may support a variety of types of peripheral buses, such as a peripheral component interconnect (PCI) bus, a universal serial bus (USB) bus, and/or a Serial Advanced Technology Attachment (SATA) bus, for connecting to other system components. The system components may include one or more I/O devices 170, such as a keyboard, a mouse, a removable media drive, etc., one or more persistent storage devices 175, such as a hard disk drive, a solid-state drive, or another type of persistent data store, one or more network interfaces 180, such as an Ethernet interface or a Wi-Fi adaptor, among other system components. The network interface(s) 180 may allow communication with other electronic devices over a computer network, such as the Internet, to enable various types of collaborative, distributed, or remote computing.

Working together, the components of the electronic device 100 (and other electronic devices in the case of collaborative, distributed, or remote computing) may execute a number of different types of software that operate upon data of different types from different sources. For example, software of a visualization and analysis application 190 may access data from data sources (e.g., files), including 2.5D point data and potentially 2.5D grid data from 0.5D data sources 195 that 3D point data from 3D data sources 197. The software and data are loaded from a storage device 175 to the system memory 130 when needed, and provided to the CPU 110 and other system components. In specific implementations, the application 190 may be a mapping-related application (such as the Bentley Map® 2D/3D desktop geographic information system (GIS) and mapping application), a civil infrastructure-related application (such as the Bentley OpenRoads™ transportation, civil analysis and design application), a mining-related application (such as the Bentley MineCycle™ Survey mine survey application), or another type of application that may utilize a combination of 2.5D point data and potentially 2.5D grid data, and 3D point data. Further, for example, the 2.5D point data may be one or more height maps or digital terrain models, the 2.5D grid data may be a raster grid, and the 3D point data may be one or more point clouds.

In operation, the visualization and analysis application 190 may build a hybrid spatial index from the 2.5D point data (and potentially 2D grid data) from the 2.5D data sources 195 and the 3D point data from the 3D data sources 197, whose nodes are labeled as containing 2.5D data or 3D data, and then use the hybrid spatial index to reconstruct a mesh surface (e.g., a multi-resolution mesh surface) and analyze the mesh surface, taking advantage of more efficient algorithms adapted to specific types of data.

Figure 2:
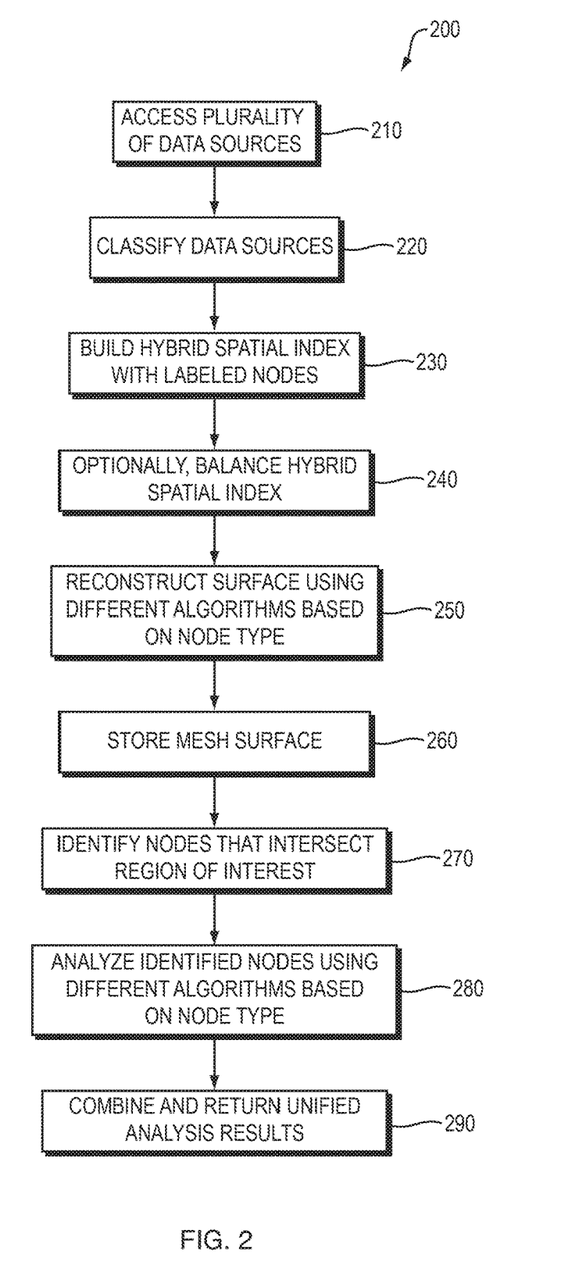
FIG. 2 is a flow diagram of an example sequence of steps that may be executed by a visualization and analysis application to reconstruct and analyze a mesh surface (e.g., a multi-resolution mesh surface)

FIG. 2 is a flow diagram of an example sequence of steps 200 that may be executed by the visualization and analysis application 190 to reconstruct and analyze a mesh surface (e.g., a multi-resolution mesh surface). At step 210, the application 190 accesses a plurality of data sources from the system memory 130, including the zero or more 2.5D data sources 195 and zero or more 3D data sources 197. At step 220, the application 190 classifies each of the data sources as being a 2.5D data source 195 or a 3D data source 197, for example, based on default assumptions (e.g., file types) or explicit user input. At step 230, the application 190 builds a hybrid spatial index. The hybrid spatial index is organized as a tree having a plurality of nodes arranged in one or more levels. Each node is labeled as containing 2.5D data or 3D data. In one configuration, a node associated with only 2.5D point data (or potentially 2.5D grid data) may be labeled as containing 2.5D data, while a node associated with at least some 3D point data (i.e. all 3D point data or a mixture of 2.5D point data and 3D point data) may be labeled as containing 3D data. The tree originates at a root node and extends to leaf nodes, with branching of the tree defining a number of parent node-child node relationships. The branching may be adaptive to the type of data of the parent nodes (i.e., 2.5D data or 3D data), such that branching from a parent node labeled as containing 2.5D data to child nodes differs from branching from a parent node labeled as containing 3D data to child nodes. At step 240, the application 190 optionally balances the hybrid spatial index so that all leaf nodes are on the same level. At step 250, the application 190 reconstructs a mesh surface by executing a reconstruction process independently on data associated with each node of the hybrid spatial index. The reconstruction process employs a different reconstruction algorithm on data of nodes labeled as containing 2.5D data than on nodes labeled as containing 3D data. For example, point data of nodes labeled as containing 2.5D data may be reconstructed by applying a 2.5D specific reconstruction algorithm, such as a 2.5D Delaunay triangulation algorithm, while point data of nodes labeled as containing 3D data may be reconstructed by applying a 3D capable reconstruction algorithm, such as a Poisson surface reconstruction algorithm or 3D Delaunay triangulation algorithm, that may be capable of handling both 2.5D and 3D data. At step 260, the reconstructed mesh surface is stored in connection with the hybrid spatial index so that it can be readily accessed using the index. The mesh surface may be accessed (not shown) for display on the display screen 160 or other purposes, such as to perform analysis.

To perform analysis on the mesh surface, at step 270, the application 190 first executes a query to identify nodes that intersect a region of interest. Then, at step 280, the application 190 analyzes (e.g., calculates volume of, projects rays of, etc.) the portion of the mesh surface of nodes labeled as containing 2.5D data separately from the portion of the mesh surface of nodes labeled as containing 3D data, applying different analysis algorithms. The portion of the mesh surface of nodes labeled as containing 2.5D data may be analyzed using one or more 2.5D specific analysis algorithms, while the portion of the mesh surface of nodes labeled as containing 3D data may be analyzed using one or more 3D capable analysis algorithms. Then, at step 290, the application 190 combines (e.g., adds volumes between 2.5D and 3D regions, projects rays across 2.5D and 3D regions, etc.) and returns (e.g., displays on a display screen 160 or stores in system memory 130) unified analysis results.

Figure 3:
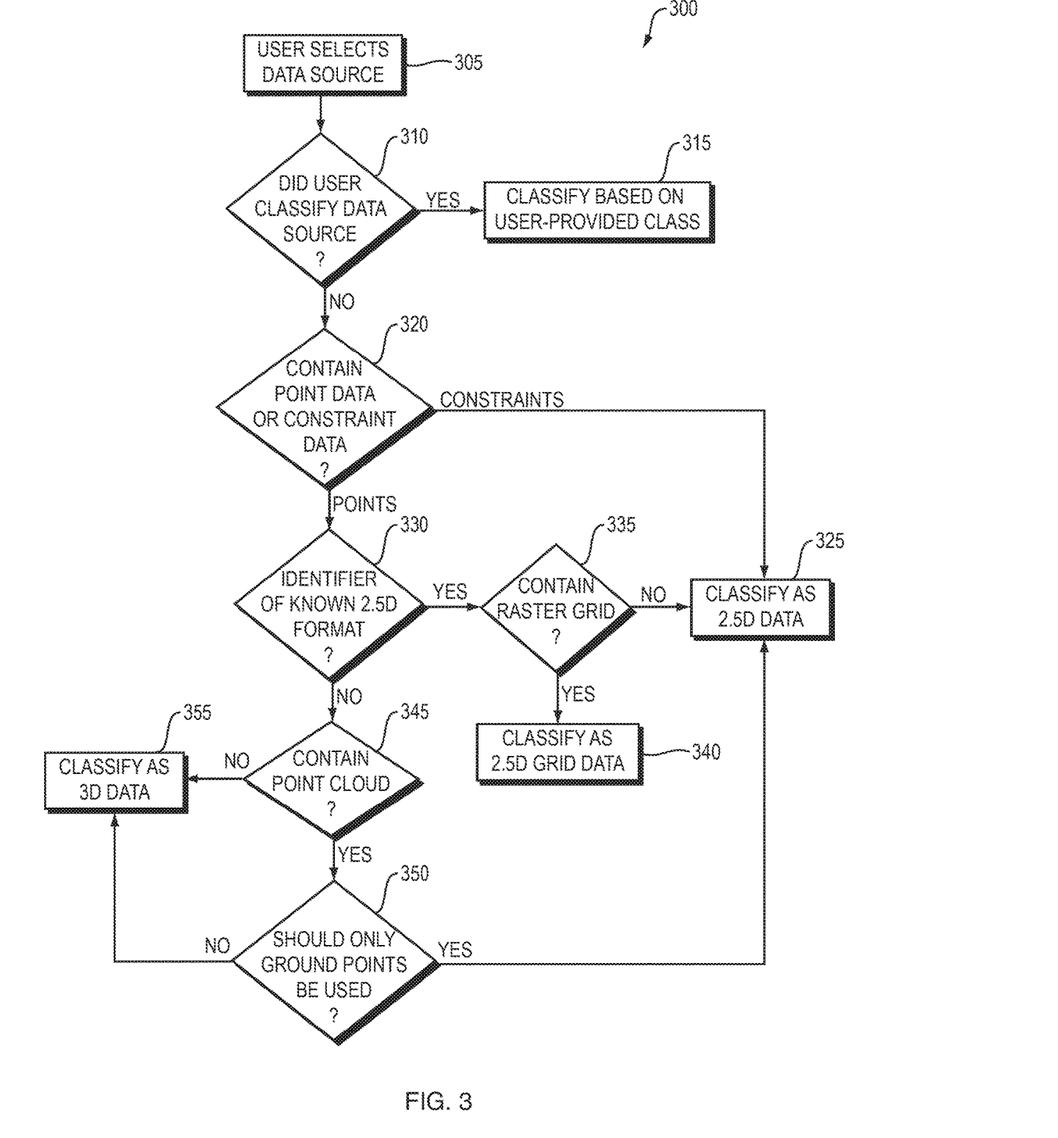
FIG. 3 is a flow diagram of an example sequence of steps that may be executed for each data source as part steps of FIG. 2 to access the data source and classify it as being a 2.5D data source or a 3D data source.

Looking to the operation of the application 190 in more detail, FIG. 3 is a flow diagram of an example sequence of steps 300 that may be executed for each data source as part of steps 210 and 220 of FIG. 2 to access the data source and classify it as being a 2.5D data source 195 or a 3D data source 197. At step 305, the application 190 receives user input in its user interface selecting a data source (e.g., a file) to import. At step 310, the application 190 may optionally receive further user input explicitly classifying the data source as 2.5D (e.g., containing only 2.5D data) or 3D (e.g., containing at least some 3D data). If such optional user input is received, at step 315, the application 190 classifies the data source as being a 2.5D data source or a 3D data source based thereon. Otherwise, execution proceeds to step 320, where the application 190 determines whether the data source contains point data or constraint data. If it contains constraint data, execution proceeds to step 325, where the data source is classified as containing 2.5D data. If it contains point data, execution proceeds to step 330, where the application 190 determines whether the data source has an identifier (e.g., a file extension) of a known 2.5D format (e.g., a TIN file). If so, execution proceeds to step 335, where the application 190 determines if the data source contains a raster grid, such as a digital elevation model (DEM) represented as a raster. If so, at step 340, it is classified as containing a 2.5D grid data, which is considered a sub-type of 2.5D data. If not, at step 325, it is classified as containing a 2.5D data. Returning to step 330, if the data source does not have an identifier (e.g., file extension) of a known 2.5D file format, execution proceeds to step 345 where the application 190 determines if the data source contains a point cloud by looking to known storage formats (e.g., file formats) for that type of data (e.g., a POD file format, a XYZ file format, etc.). If it contains a point cloud, at optional step 350, the application requests a user to select whether ground points should be utilized from the point cloud (which can be represented in 2.5D), and, if so, execution proceeds to step 325 where the data source is classified as containing 2.5D data. Otherwise, if it is determined to not contain a point cloud in step 345, or the user optionally indicates points other than only ground points should be utilized, execution proceeds to step 355 where the data source is classified as containing 3D data.

Figure 4:
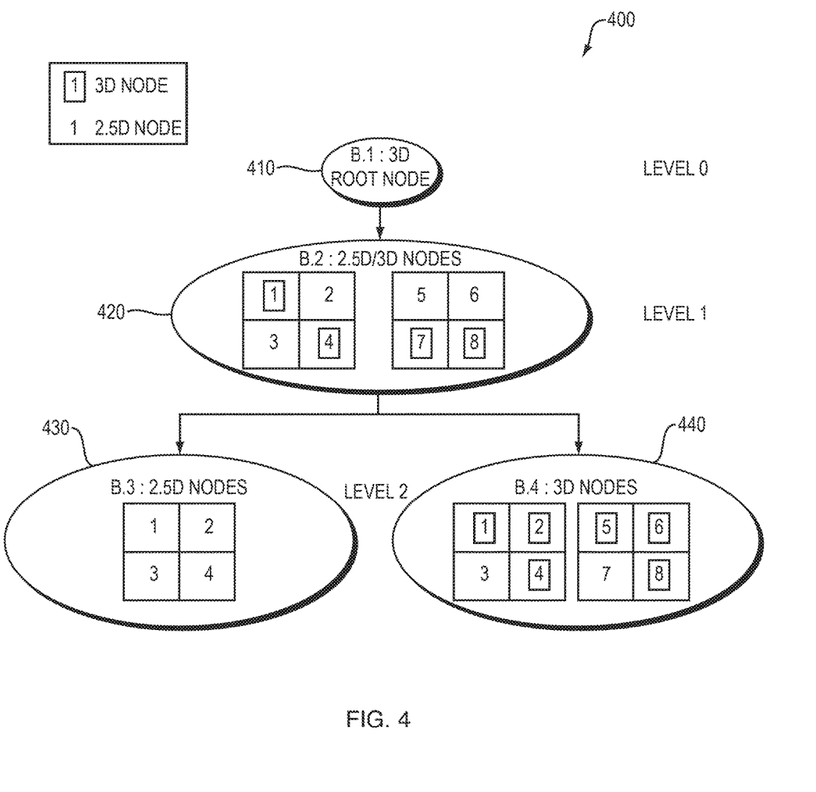
FIG. 4 is a diagram of an example hybrid spatial index structured as a tree, which may be built as part a step of FIG. 2.

FIG. 4 is a diagram of an example hybrid spatial index 400 structured as a tree, which may be built as part of step 230 of FIG. 2. In this example, the hybrid spatial index includes 3 levels (Level 0, Level 1 and Level 2), however it should be understood that the index may include any number of levels. The hybrid spatial index is rooted at a root node 410 labeled in this example as containing 3D data (which is typical since any node that is associated with at least some 3D data is labeled as containing 3D data). The branching in the tree is adaptive to the type of data of each node, such that parent nodes labeled as containing 2.5D data branch to four child nodes that spatially divide the parent node into a 2×2 grid in x-y space, while parent nodes labeled as containing 3D data branch to eight child nodes that spatially divide the parent node in a 2×2×2 grid in x-y-z space. In this example, the root node 410 is split into 8 child nodes 420, four of which are labeled as containing 2.5D data and four of which are labeled as containing 3D data. Each of these nodes is split into child nodes at Level 2, with each node labeled as containing 2.5D data split into four child nodes 430 and each node labeled as containing 3D data split into eight child nodes 440. Nodes labeled as containing 2.5D data are always split into further 2.5D nodes, while nodes labeled as containing 3D data may be split into 2.5D nodes and 3D nodes. Run length encoding may be used within a node labeled as containing 3D data to track which data is 3D data and which is 2.5D data.

Figure 5:
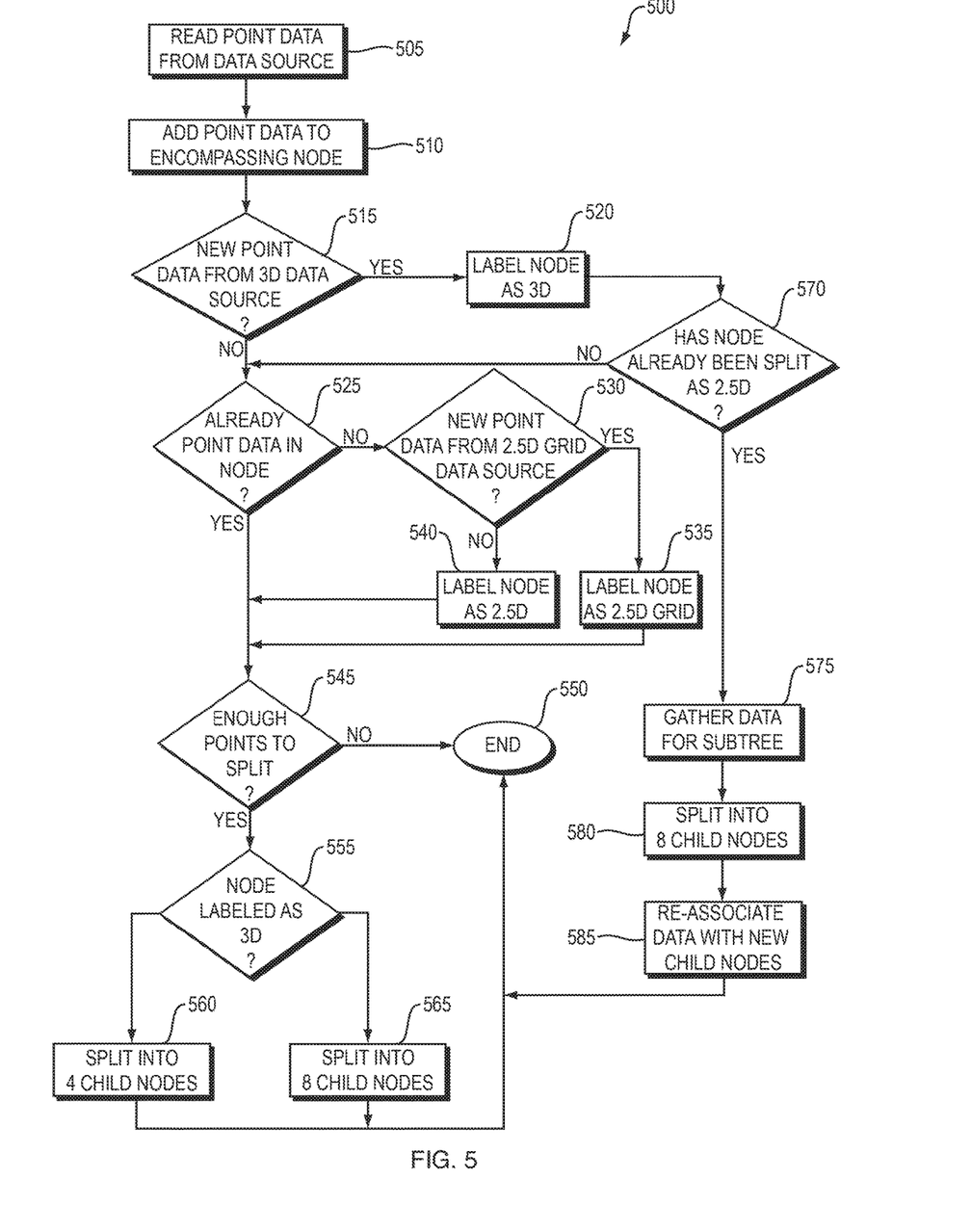
FIG. 5 is a flow diagram of an example sequence of steps that may be executed as part of a step of FIG. 2, to build a hybrid spatial index such as the example shown in FIG. 4.

FIG. 5 is a flow diagram of an example sequence of steps 500 that may be executed as part of step 230 of FIG. 2, to build a hybrid spatial index such as the example 400 shown in FIG. 4. At step 505, the application 190 reads point data (and possibly also constraint data) of a spatial area from an already classified data source. At step 510, the application 190 adds the point data (and possibly also constraint data) to a node of the hybrid spatial index that encompasses that spatial area. At step 515, the application determines whether the point data came from a data source classified as containing 3D data. If so, at step 520 the application 190 labels the node as containing 3D data. If not, at step 525, the application 190 determines whether there was already any point data associated with the node (i.e. was the node empty). If there was no point data already associated with the node, at step 530, it is determined if the point data came from a data source classified as containing a 2.5D raster grid. If so, at step 535, the application 190 labels the node as containing 2.5D grid data. If not, at step 540, the application 190 labels the node as containing 2.5D data.

After labeling the node, or if there was already point data associated with the node, execution proceeds to step 545 where the application 190 determines if the node upon addition of the new point data would have more than a threshold number of points. If not, execution terminates for this iteration at step 550. If so, at step 555 the application 190 determines if the node was labeled as containing 3D data. If not, execution proceeds to step 560, where the application 190 splits the node into four child nodes and execution terminates for this iteration at step 550. If not, execution proceeds to step 565, where the application 190 splits the node into eight child nodes and execution terminates for this iteration at step 550.

Looking back to the steps that may occur after marking the node as containing 3D data in step 520, at step 570 the application determines whether 3D point data is being added to a node previously labeled as containing 2.5D data (e.g., was split according to 2.5D convention as in step 560). If not, execution proceeds to step 525. If so, the node's subtree is re-split. At step 575, data associated with the node's child nodes and any descendent nodes thereof is gathered to produce a set of data for the subtree. At step 580, the node is split into eight new child nodes that are labeled as containing 2.5D data or 3D data as appropriate. Then, at step 585, the set of data for the subtree is re-associated with the new child nodes, and execution terminates for this iteration at step 550.

The series of step 500 is iteratively repeated for different spatial areas and for different classified data sources until an entire spatial area of interest and all data sources have been incorporated into the hybrid spatial index.

Figure 6:
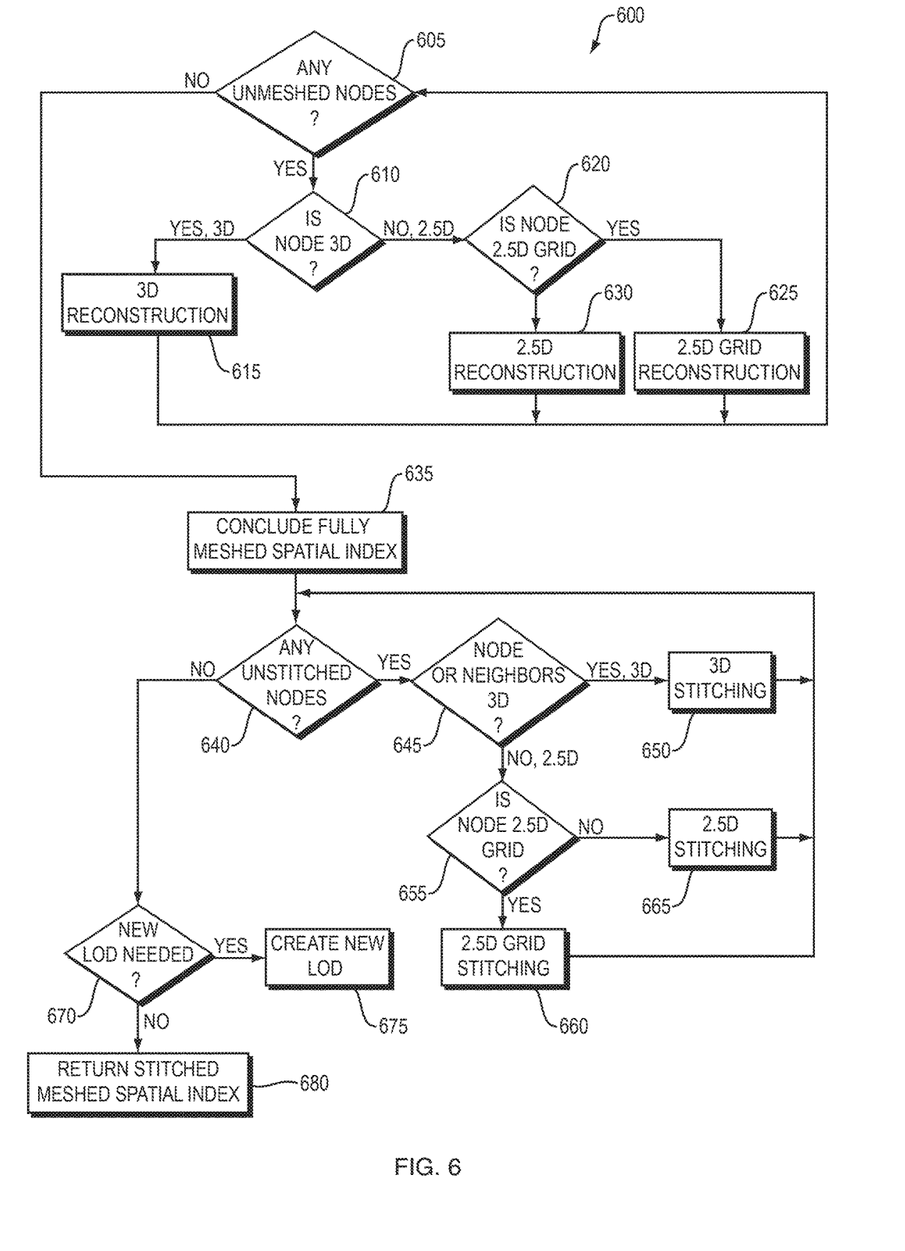
FIG. 6 is a flow diagram of an example sequence of steps that may be executed as part of a step of FIG. 2, to reconstruct a mesh surface using the nodes of a hybrid spatial index.

FIG. 6 is a flow diagram of an example sequence of steps 600 that may be executed as part of step 250 of FIG. 2, to reconstruct a mesh surface using the nodes of a hybrid spatial index. At step 605, the application 190 determines if any node remains that is associated with point data that is unmeshed (referred to as unmeshed nodes). If at least one unmeshed node remains, at step 610 the application 190 selects a new unmeshed node and determines if the node is labeled as containing 3D data. If so, execution proceeds to step 615, where the application 190 applies a 3D capable reconstruction algorithm to the point data associated with the node, such as a Poisson surface reconstruction algorithm or 3D Delaunay triangulation algorithm. The 3D capable reconstruction algorithm may be capable of handling any 2.5D point data that may be mixed with the 3D point data. If not, execution proceeds to step 620, where the application 190 determines if the node is labeled as containing 2.5D grid data. If so, at step 625 the application 190 triangulates the grid by creating links between neighboring cells thereof. If not, and thereby it can be concluded the node is labeled as containing 2.5D data, at step 630 the application 190 executes a 2.5D specific reconstruction algorithm, such as a 2.5D Delaunay triangulation algorithm. Execution loops back to step 605 until there are no remaining unmeshed nodes, and it is concluded at step 635 that the hybrid spatial index is a fully meshed spatial index.

At step 640, the application 190 determines if any node remains that is associated with a mesh that has not been stitched to neighboring meshes (referred to as unstitched nodes). If at least one unstitched node remains, at step 645 the application 190 selects a new node and determines if the node is labeled as containing 3D data, or if any of its neighboring nodes are labeled as containing 3D data. If so, execution proceeds to step 650, where the application 190 applies a 3D capable stitching algorithm to the node. If not, execution proceeds to step 655, where the application 190 determines if the node is labeled as containing 2.5D grid data. If so, at step 660 the application 190 applies a grid stitching algorithm to the node. If not, and thereby it can be concluded that the node contains 2.5D data, at step 665 the application applies a 2.5D specific stitching algorithm to the node. Execution loops back to step 640 until all nodes stitched.

Thereafter, at step 670, it is determined if one or more additional levels of detail (LODs) need to be created to produce a multiresolution mesh surface. If so, execution proceeds to step 675, where step 605-670 are repeated for another level of detail. If not, at step 680, the resulting mesh surface is returned.

Figure 7:
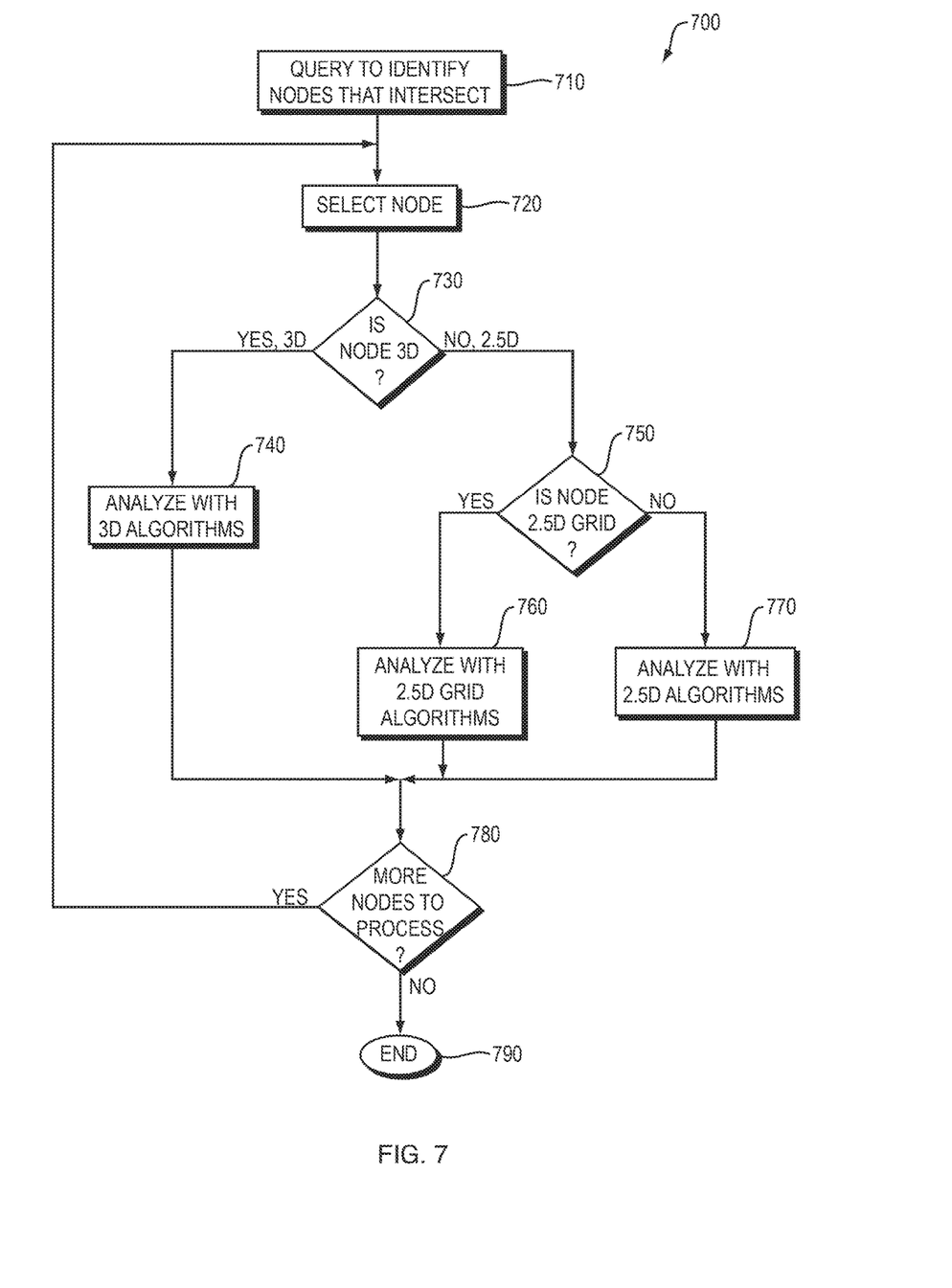
FIG. 7 is a flow diagram of an example sequence of steps that may be executed as part of steps of FIG. 2, to analyze a mesh surface using the nodes of a hybrid spatial index

FIG. 7 is a flow diagram of an example sequence of steps 700 that may be executed as part of steps 270-280 of FIG. 2, to analyze a mesh surface using the nodes of a hybrid spatial index. The analysis may include volume calculation, ray projection, vector draping, drainage computation or a wide variety of other types of spatial or functional analysis. At step 710, the application 190 executes a query to identify nodes that intersect a region of interest area (e.g., a query box, a query plane, a camera point of view, etc.). The identified nodes may include a mixture of nodes labeled as containing 2.5D data and nodes labeled as containing 3D data, only nodes labeled as containing 2.5D data, or only nodes labeled as containing 2.5D data. At step 720, the application 190 selects a node of the identified nodes. At step 730, the application 190 determines if the node is labeled as containing 3D data. If so, at step 740, the mesh surface of the node is analyzed using one or more 3D capable analysis algorithms. If not, execution proceeds to step 750, where the application 190 determines if the node is labeled as containing 2.5D grid data. If so, at step 760, the mesh surface of the node is analyzed using one or more 2.5D grid specific analysis algorithms. If not, and thereby it can be concluded that the node is labeled as containing 2.5D data, at step 770, the mesh surface of the node is analyzed using one or more 2.5D specific analysis algorithms. At step 780, it is determined whether there are more nodes to process in the identified nodes, and if so execution loops back to step 720 where another node is selected. Otherwise the sequence of steps ends at step 790

In summary, the above description details techniques for reconstructing and analyzing mesh surfaces based on a combination of 2.5D and 3D point data. It should be understood that various adaptations and modifications may be readily made to what is described above, to suit various implementations and applications. While it is discussed above that many aspects of the techniques may be implemented in software (e.g., as executable instructions stored in a non-transitory electronic device readable medium for execution on one or more processors), it should be understood that some or all of the techniques may also be implemented in hardware, for example, in hardware of the GPU. A hardware implementation may include specially configured logic circuits and/or other types of hardware components. Above all, it should be understood that the above descriptions are meant to be taken only by way of example.

What is claimed is:

1. A method comprising:
accessing, a plurality of data sources that collectively include 2.5D point data and 3D point data;
classifying each of the data sources as being either a 2.5D data source or a 3D data source;
building, by the application, a hybrid spatial index organized as a tree having nodes associated with point data, the nodes arranged in one or more levels according to parent-child relationships, each node labeled as containing 2.5D data or 3D data;
executing, by the application, a reconstruction process independently on point data associated with each node of the hybrid spatial index to reconstruct a mesh surface, wherein the reconstruction process employs a different reconstruction algorithm on nodes labeled as containing 2.5D data than on nodes labeled as containing 3D data; and
storing the reconstructed mesh surface.

2. The method of claim 1, wherein branching in the hybrid spatial index is adaptive to whether each parent node is associated with 2.5D data or 3D data, such that branching from a parent node labeled as containing 2.5D data differs from branching from a parent node labeled as containing 3D data.

3. The method of claim 2, wherein parent nodes labeled as containing 2.5D data branch to four child nodes and parent nodes labeled as containing 3D data branch to eight child nodes.

4. The method of claim 1, wherein a 2.5D specific reconstruction algorithm is employed on nodes labeled as containing 2.5D data and a 3D capable reconstruction algorithm is employed on nodes labeled as containing 3D data.

5. The method of claim 4, wherein the 2.5D specific reconstruction algorithm is a 2.5D Delaunay triangulation algorithm.

6. The method of claim 4, wherein the 3D capable reconstruction algorithm is a Poisson surface reconstruction algorithm or a 3D Delaunay triangulation algorithm.

7. The method of claim 1, further comprising:
performing analysis on the mesh surface, wherein a different analysis algorithm is employed on portions of the mesh surface of nodes labeled as containing 2.5D data than on portions of the mesh surface of nodes labeled as containing 3D data;
combining results of the analysis to produce unified analysis results; and
returning the unified analysis results.

8. The method of claim 7, wherein a 2.5D specific analysis algorithm is employed on the portions of the mesh surface of nodes labeled as containing 2.5D data and a 3D capable analysis algorithm is employed on the portions of the mesh surface of nodes labeled as containing 3D data.

9. The method of claim 7, wherein the analysis includes at least one of volume calculation, ray projection, vector draping or drainage computation.

10. The method of claim 1, wherein a node that is associated with a combination of 2.5D point data and 3D point data is labeled as containing 3D data.

11. A method comprising:
accessing, by an application executing on an electronic device, a hybrid spatial index for a mesh surface, the hybrid spatial index organized as a tree including nodes arranged in one or more levels according to parent-child relationships, each node labeled as containing 2.5D data or 3D data;
performing, by the application, analysis on the mesh surface, wherein a different analysis algorithm is employed on a portion of the mesh surface of nodes labeled as containing 2.5D data than a portion of the mesh surface of nodes labeled as containing 3D data;
combining results of the analysis to produce unified analysis results; and
returning the unified analysis results.

12. The method of claim 11, wherein a 2.5D specific analysis algorithm is employed on the portions of the mesh surface of nodes labeled as containing 2.5D data and a 3D capable analysis algorithm is employed on the portions of the mesh surface of nodes labeled as containing 3D data.

13. An electronic device comprising:
a display screen;
a processor; and
a memory coupled to the processor and configured to store a plurality of data sources that collectively include 2.5D point data and 3D point data, and to store instructions of a visualization and analysis application, the instructions executable on the processor and when executed operable to:
access the plurality of data sources in the memory;
classify each of the data sources as being either a 2.5D data source or a 3D data source;
build a hybrid spatial index organized as a tree having nodes associated with point data arranged in one or more levels according to parent-child relationships, wherein branching from a parent node labeled as containing 2.5D data differs from branching from a parent node labeled as containing 3D data;
execute a reconstruction process independently on point data associated with each node of the hybrid spatial index to reconstruct a mesh surface; and
display the reconstructed mesh surface on the display screen.

14. The electronic device of claim 13, wherein each node of the hybrid spatial index is labeled as containing 2.5D data or 3D data, and the reconstruction process employs a different reconstruction algorithm on nodes labeled as containing 2.5D data than on nodes labeled as containing 3D data.

15. The electronic device of claim 14, wherein a 2.5D specific reconstruction algorithm is employed on nodes labeled as containing 2.5D data and a 3D capable reconstruction algorithm is employed on nodes labeled as containing 3D data.

16. The electronic device of claim 15, wherein the 2.5D specific reconstruction algorithm is a 2.5D Delaunay triangulation algorithm and the 3D capable reconstruction algorithm is a Poisson surface reconstruction algorithm or a 3D Delaunay triangulation algorithm.

17. The electronic device of claim 13, wherein each node of the hybrid spatial index is labeled as containing 2.5D data or 3D data and the instructions when executed are further operable to:
perform analysis on the mesh surface, wherein a different analysis algorithm is employed on a portion of the mesh surface of nodes labeled as containing 2.5D data than a portion of the mesh surface of nodes labeled as containing 3D data;
combine results of the analysis to produce unified analysis results; and
return the unified analysis results.

18. The electronic device of claim 17, wherein a 2.5D specific analysis algorithm is employed on the portion of the mesh surface of nodes labeled as containing 2.5D data and a 3D capable analysis algorithm is employed on the portion of the mesh surface of nodes labeled as containing 3D data.

19. The electronic device of claim 17, wherein the analysis includes at least one of volume calculation, ray projection, vector draping or drainage computation.

20. The electronic device of claim 17, wherein a node that is associated with a combination of 2.5D point data and 3D point data is labeled as containing 3D data.

* * * * *